O. L. HEINTZ.
VEHICLE ATTACHMENT FOR MOTOR AND OTHER CYCLES.
APPLICATION FILED AUG. 30, 1915.
1,311,816.
Patented July 29, 1919.
3 SHEETS—SHEET 3.
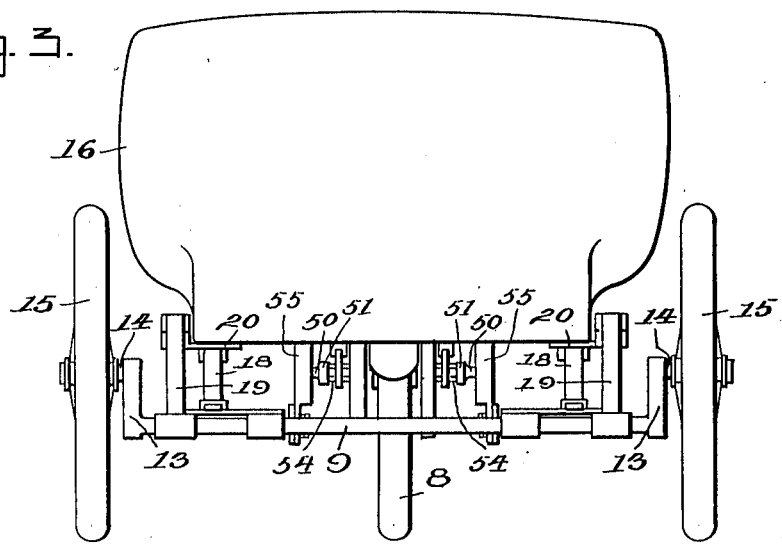
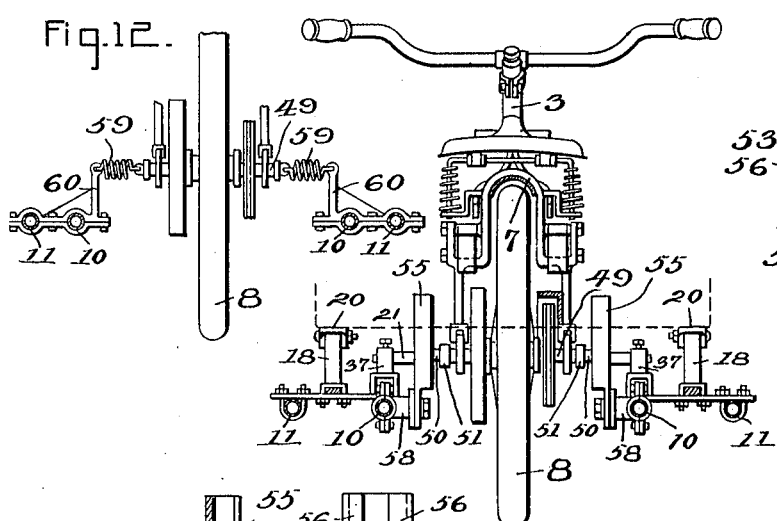
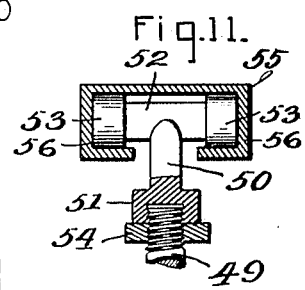
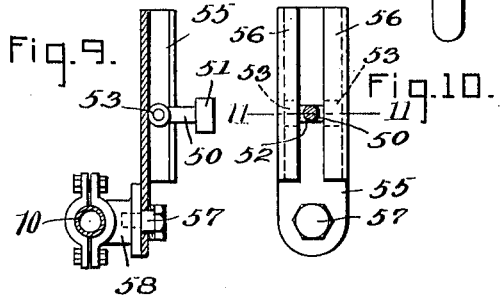
INVENTOR
Otto L. Heintz
by Seyer & Popp
ATTORNEYS

UNITED STATES PATENT OFFICE.

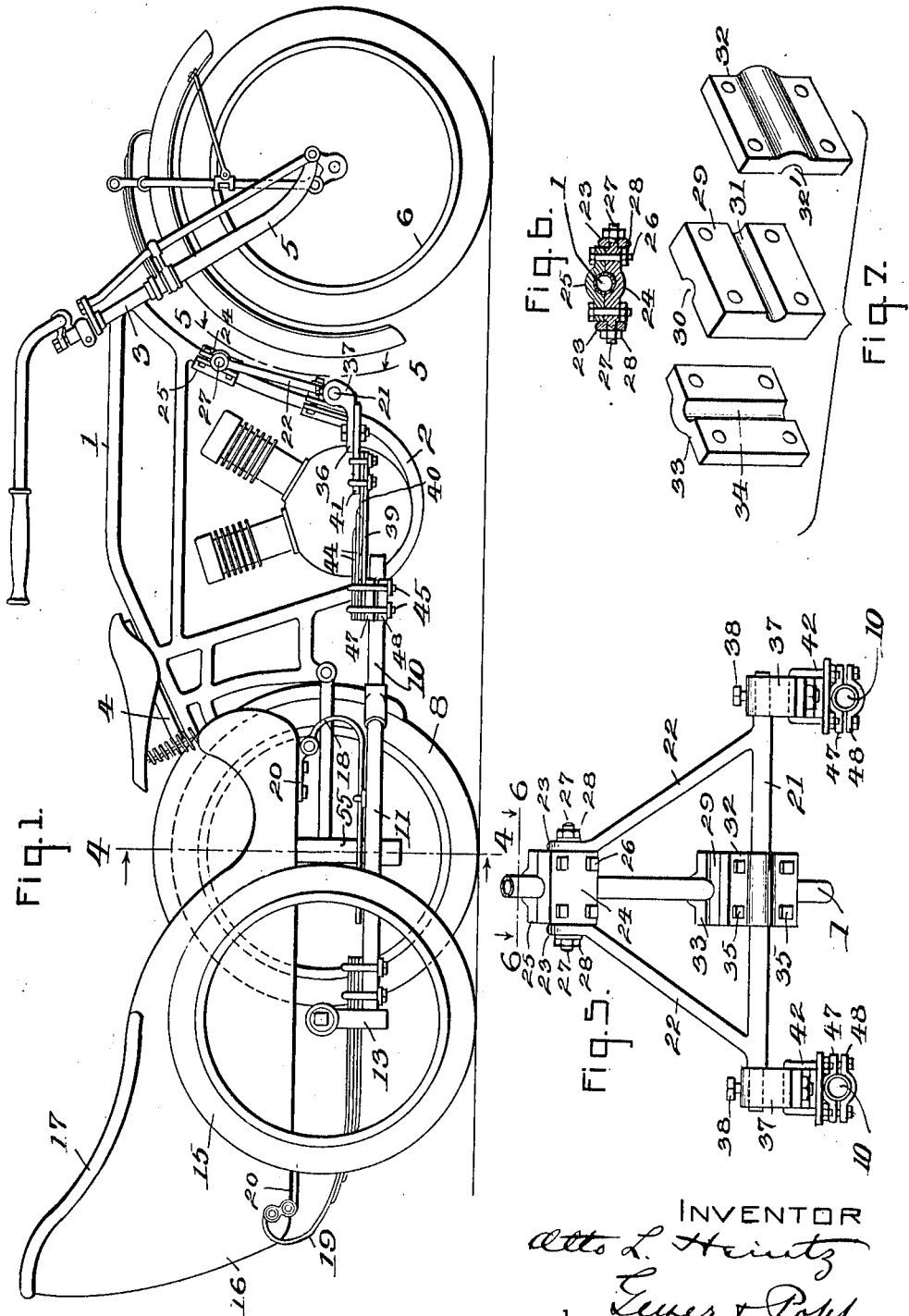

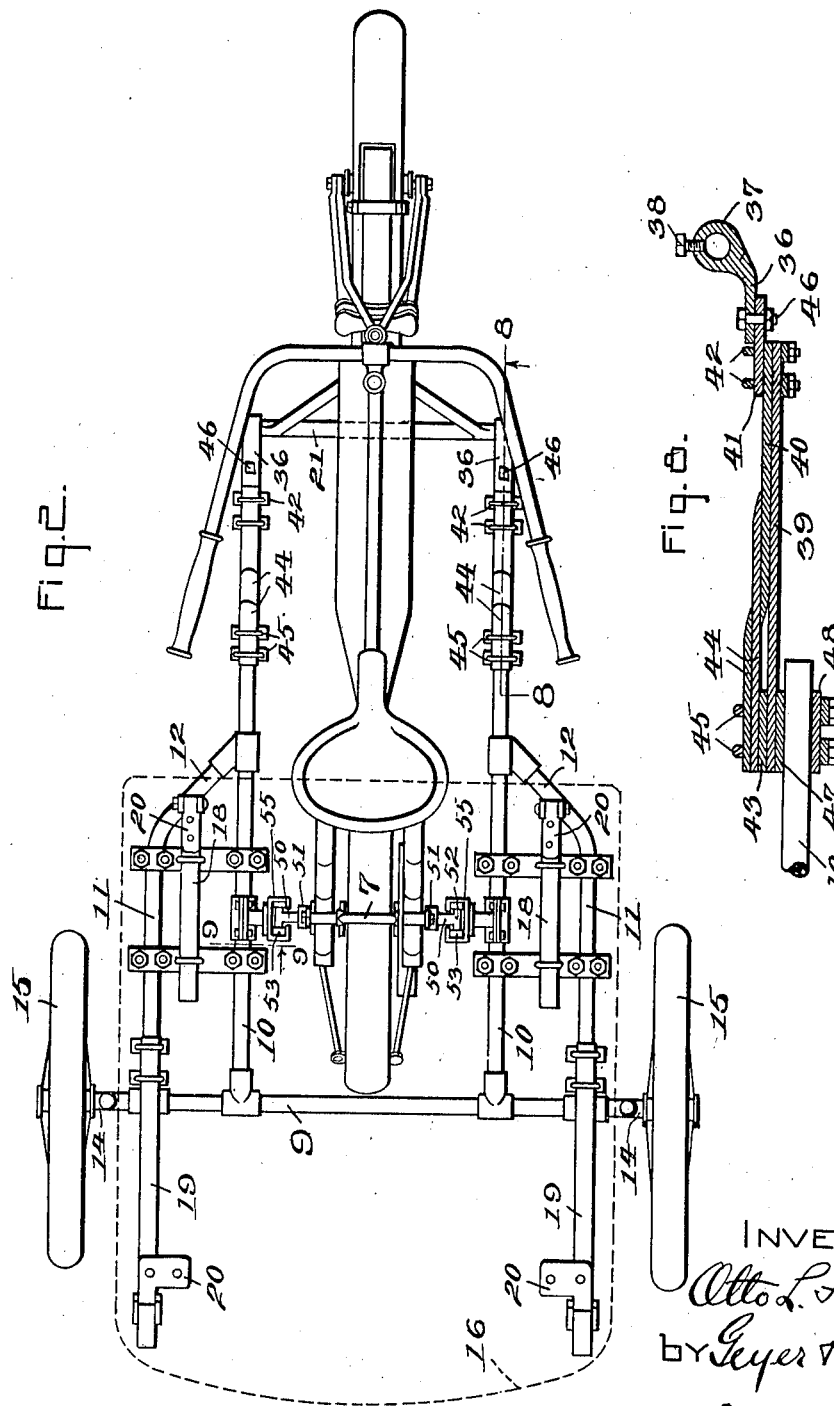

OTTO L. HEINTZ, OF BUFFALO, NEW YORK.

VEHICLE ATTACHMENT FOR MOTOR AND OTHER CYCLES.

1,311,816.  Specification of Letters Patent.  Patented July 29, 1919.

Application filed August 30, 1915. Serial No. 47,956.

*To all whom it may concern:*

Be it known that I, OTTO L. HEINTZ, a citizen of the United States, residing at Buffalo, in the county of Erie and State of New York, have invented new and useful Improvements in Vehicle Attachments for Motor and other Cycles, of which the following is a specification.

This invention relates to a vehicle attachment for motor and other cycles whereby an ordinary two-wheeled motor driven cycle may be readily converted into a motor car capable of carrying a number of persons easily and conveniently and on a wheel base which rests on the ground at four points.

The object of this invention is to provide an attachment of this character which is simple and durable in construction, which can be readily attached to and removed from various types of motor cycles now found on the market, which is neat and attractive in appearance and which permits of carrying a greater number of passengers or load with the same degree of comfort and efficiency as an ordinary automobile.

In the accompanying drawings:

Figure 1 is a side elevation of a motor cycle equipped with my improved vehicle attachment. Fig. 2 is a top plan view of the same with the body omitted. Fig. 3 is a rear elevation of the car. Fig. 4 is a vertical transverse section on line 4—4, Fig. 1. Fig. 5 is a vertical transverse section, on an enlarged scale, taken on line 5—5, Fig. 1. Fig. 6 is a horizontal section on line 6—6, Fig. 5. Fig. 7 is a separated perspective view of the several members of the lower clamp for securing the supporting bracket on the motor cycle frame. Fig. 8 is a fragmentary vertical longitudinal section, on an enlarged scale, of one of the connecting springs between the motor cycle and the vehicle attachment, taken on line 8—8, Fig. 2. Fig. 9 is a vertical section of one pair of elements for guiding the vehicle attachment and the motor cycle taken on line 9—9, Fig. 2. Fig. 10 is an inside elevation of the same. Fig. 11 is a horizontal section, on an enlarged scale, taken on line 11—11, Fig. 10. Fig. 12 is a fragmentary cross section showing a modification of the means for holding the motor cycle and vehicle attachment in place laterally relatively to each other.

Similar characters of reference indicate corresponding parts throughout the several views.

My improved vehicle attachment is designed for use in connection with any of the well known types of motor cycles which are now in general use and vary but little in their main features of construction, the attachment being so designed that the same can be readily adapted to suit the slight changes in form between the same. The motor cycle which is shown in the drawings, as an example of one of the various makes capable of receiving the vehicle attachment containing my invention, comprises a main frame having an upper longitudinal bar 1, a lower longitudinal bar 2, a steering head 3 connecting the front ends of the upper and lower bars and a seat post 4 arranged between the rear ends of the longitudinal bars.

5 represents the usual front steering fork which is journaled in the steering head and supports the front steering wheel 6, and 7 represents the rear fork which is connected with the rear part of the main frame and supports the rear or driving wheel 8. While this particular motor cycle is capable of receiving my improved vehicle attachment it is to be understood that my invention is capable of use with any other suitable form of motor cycle.

The main frame of the vehicle attachment is generally constructed in the form of the letter U the transverse part of which is adapted to be arranged in rear of the motor cycle while the branches or legs thereof are adapted to project forwardly and lengthwise on opposite sides of the motor cycle. As shown in the drawings, the transverse part of the frame of the vehicle attachment comprises a transverse axle or cross piece 9 and each of the branches comprises an inner longitudinal bar 10 extending forwardly from the cross piece 9, and an outer longitudinal bar 11 which is arranged adjacent to the outer side of the inner bar but is spaced apart therefrom and is connected at its rear end with the cross piece 9 while its front end is provided with an inwardly turned portion 12 which is connected with the adjacent inner longitudinal bar between the front and rear ends of the latter. By this construction each branch of the U-shaped main frame is provided with a comparatively long inner bar 10 and a shorter outer bar 11 which produces a strong and rigid construction and also causes the main frame of the vehicle attachment to gradually widen from its front end toward its rear end for increasing the rigidity of the same and also presenting a neat appearance.

At its opposite ends the cross piece 9 is provided with upwardly projecting supporting arms 13 which latter in turn are provided with outwardly projecting axle arms 14 upon which the supporting wheels 15 of the vehicle attachment are journaled.

Upon this frame of the vehicle attachment is mounted a body which may be of any suitable construction for carrying passengers or merchandise. As shown in the drawings, this body 16 is constructed for the transportation of passengers and has a seat 17 which is wide enough to accommodate a number of persons and enable the same to look forward on opposite sides of the motor cycle with which the attachment is connected. This body is preferably supported yieldingly upon the main frame of the vehicle attachment, this being accomplished for instance by means of front and rear springs 18, 19 connecting the front and rear ends of the body with transverse cleats 20 on the front and rear parts of the inner and outer longitudinal bars of the vehicle attachment frame.

To permit of readily connecting this vehicle attachment with the motor cycle frame or disconnecting the same therefrom the lower bar 2 of the main frame of the motor cycle is provided with a bracket which is preferably so constructed that the same may remain permanently connected with this bar. Inasmuch as the latter is usually inclined forward more or less in different motor cycles the means for coupling this attachment with this bar are so designed that they are capable of adjustment to suit the different angles of such bars in different makes of motor cycles. Although this bracket may be variously constructed that shown in the drawings is suitable and is constructed as follows:

21 represents a cross bar adapted to be arranged in front of the lower part of the lower motor cycle frame bar 2 and 22, 22 two braces which are connected at their lower ends with this cross bar near opposite ends thereof and provided at their upper ends with coupling eyes 23, 23, said braces converging forwardly and upwardly from the cross bar. On the upper part of the lower motor cycle frame bar 2 is arranged a clamp or fastening with which the upper ends of the braces are connected in such manner that the latter may be turned in a vertical plane to the desired position relatively to the motor cycle frame in order to bring these parts in proper position for connecting the same. In its preferred form this coupling device comprises two body sections or blocks 24, 25 which have their opposing sides recessed to engage with opposite sides with the lower frame bar 2 and held in engagement therewith by means of clamping bolts 26 connecting the body sections, as shown in Figs. 5 and 6. At its opposite ends one of the clamping body sections, preferably the front section 24, is provided with laterally projecting pivot pins or coupling trunnions 27 which receive the eyes 23 at the upper ends of the bracket braces 22, these eyes being retained on these pivot pins by means of screw nuts 28 applied to the threaded ends of these pivot pins or by any other suitable means.

The cross bar 21 of the bracket is detachably connected with the lower part of the lower motor cycle frame bar 2 by a clamping device which comprises an intermediate block 29 provided on its opposite sides with grooves or seats 30, 31 arranged at right angles to each other and adapted to receive the proximate sides of the cross bar 21 and the motor cycle bar 2, a front block 32 provided on its inner side with a groove or seat 32' engaging with the front side of the bracket cross bar 21, a rear block 33 provided on its inner side with a groove or seat 34 engaging with the rear side of the motor cycle bar 2 and clamping bolts 35 connecting these several clamping blocks on opposite sides of the bracket cross bar and the motor cycle frame bar 2. By this means of mounting the bracket on the motor cycle frame bar 2 this latter may be arranged at different angles and still permit of mounting the bracket thereon in the proper position to receive the detachable portion of the vehicle attachment, inasmuch as the cross bar 21 can be turned in the lower clamp and the braces 22 turned on the upper clamp in a vertical plane until these parts assume the proper position preparatory to being fixed on the motor cycle frame.

At opposite ends the cross bar 21 of the attaching bracket is provided with two rearwardly projecting arms 36 to which the side branches of the vehicle attachment are adapted to be connected. These attaching arms are immovable after being once set but are capable of adjustment in a vertical plane about the cross bar 21 as an axis for the purpose of bringing the rear ends of these arms which project rearwardly from the cross bar 21 into the proper position. The preferred means for effecting this adjustment consists in providing the front ends of the attaching arms 36 with sleeves 37 which are mounted on the opposite ends of the cross bar 21 so that they are capable of rotary adjustment thereon, and providing these sleeves with clamping screws 38 whereby they may be rigidly secured to this cross bar after they have been adjusted to the desired position.

The connection between the branches of the vehicle attachment and the motor cycle frame is preferably effected by means of springs so as to permit the vehicle attachment and the motor cycle frame to move vertically independently of each other as they follow the uneven surfaces of the road or the ground over which they travel. This spring connection is preferably so constructed that the motor cycle frame and the vehicle attachment frame are incapable of moving horizontally or laterally relatively to each other, thereby maintaining these parts in proper alinement to cause the vehicle attachment to trail in a definite position behind the motor cycle so far as the relative transverse arrangement of these parts in concerned. The preferred means for this purpose comprises two leaf springs which are arranged lengthwise on opposite sides of the motor cycle and connect the front ends of the vehicle attachment branches with the attaching bracket. The leaves of each of these springs are arranged with their flat sides horizontally so that they are capable of being flexed only in a vertical direction but are rigid in a horizontal direction both laterally and lengthwise relatively to the motor cycle and the vehicle attachment. In the preferred form of each of these springs, as shown in Figs. 1, 2, 5 and 8, the same comprises a main spring leaf 39, an auxiliary front spring leaf 40 arranged over the front part of the main leaf, an attaching plate 41 arranged over the front part of the auxiliary front leaf, clips 42 connecting the attaching plate with the front ends of the main spring leaf and front auxiliary spring leaf, a spacing plate or washer 43, arranged upon the rear part of the main spring leaf, two rear auxiliary spring leaves 44 arranged with their rear ends over the spacing plate or washer 43 while their front ends lap over the front auxiliary leaf, and clips 45 connecting the rear ends of the main spring leaf, spacing plate 43 and rear auxiliary spring leaves. By this means a spring is produced which possesses the requisite resilience in a vertical direction for allowing the motor cycle and the vehicle attachment to rise and fall independently of each other and yet form a rigid connection between the motor cycle and the vehicle attachment to properly support the load imposed upon the latter and also retain these main members in the proper lateral and longitudinal position relatively to each other. Inasmuch as the available place for connecting the vehicle attachment with the motor cycle varies slightly it is desirable to make the connection between the branches of the vehicle attachment and the motor cycle attaching bracket adjustable in the direction of the length of the machine. For this purpose the front end of each connecting spring is detachably connected with this bracket and its rear end is connected with the front end of the companion branch of the vehicle attachment frame so as to permit the latter to be adjusted lengthwise relatively to the motor cycle. The preferred means for accomplishing this purpose which are shown in the drawings comprise a bolt 46 whereby the front end of the attaching plate 41 is detachably connected with the rear end of the attaching or coupling arms 36 on the respective side of the motor cycle, and an adjustable connection is provided between the rear end of this spring and the front end of the companion branch of the vehicle attachment comprising an upper clamping block 47 interposed between the underside of the rear end of the main spring leaf and the front part of the upper side of the inner bar of the adjacent branch of the vehicle attachment, a lower clamping block 48 engaging with the underside of said bar at the front end thereof. While these clamping blocks are loose the same and the inner longitudinal frame bar 10 may be moved freely lengthwise relatively to each other for bringing the vehicle attachment to the proper position after which the clips 45 embracing these blocks and the rear ends of the members of the companion leaf spring will securely hold these parts in position relatively to each other.

In order to aid the leaf springs in holding the vehicle attachment against lateral movement relatively to the motor cycle means are provided which coöperate with the rear axle 49 of the rear driving wheel of the motor cycle. This axle is fixed on the rear fork of the motor cycle and the means shown in the drawings for coöperating with this axle to prevent lateral movement of the vehicle attachment are preferably constructed as follows:

The opposite ends of the rear motor cycle axle is provided with guide heads each of which comprises a horizontal shank 50, an internally screw threaded socket 51 arranged at the inner end of the shank, a cross piece 52 arranged at the outer end of the shank and a pair of bearing rollers 53 arranged at opposite ends of the cross piece. The socket 51 engages with an external thread on the adjacent outer end of the motor cycle axle 49 and is held in its proper position by means of a clamping nut 54 arranged on the axle and engaging with the inner end of the socket, or by any other suitable means, so that the bearing rollers 53 have their axes arranged horizontally and at right angles to the axis of the motor cycle axle. 55 represents a guide channel mounted on each inner bar 10 of the vehicle attachment frame between the front and rear end thereof and provided on its inner side with two guide grooves 56 which are parallel and have their open sides facing each other. This guide channel is connected with the adjacent inner bar 10 preferably by means of a horizontal transverse pivot pin or screw 57 which is mounted on a clip or bracket 58 secured to the adjacent part of said bar 10 so that this guide channel can swing in a vertical plane lengthwise of the vehicle attachment. The rollers of the adjacent guide head engage with the inner side of the grooves of the guide channel, whereby the vehicle attachment and the motor cycle are guided in their vertical movement relatively to each other but are held against movement relatively to each other in a horizontal lateral direction relatively to these parts. Distortion or displacement of the motor cycle and the vehicle attachment are therefore avoided and a proper trailing of the vehicle attachment behind the motor cycle is assured when the same is in use. Instead of the guide channels 55 and the heads engaging therewith for holding the motor cycle and vehicle attachment in place laterally relatively to each other this result may be obtained by connecting opposite ends of the rear cycle axle 49 by springs 59 with standards or supports 60 on the adjacent parts of the inner and outer frame bars 10, 11, as shown in Fig. 12.

When it is desired to use the motor cycle without the vehicle attachment it is only necessary to detach the bolts 46 and slip the guide heads of the rear axle out of the guide channels 55, thereby leaving the motor cycle free to be used in the ordinary manner. The motor cycle and the vehicle attachment can be as easily re-assembled when it is desired to accommodate a larger number of passengers than can be carried on the motor cycle alone. By this means the utility of a motor cycle can be largely increased and used conveniently for business or other purposes without the vehicle attachment as well as for pleasure or other purposes in connection with the vehicle attachment. The expense of maintaining the motor cycle can also be readily adjusted in accordance with the work which the same is called upon to perform, less fuel being used when the motor cycle is used alone for but a single passenger, and more fuel being used only when added passengers are carried upon connecting the vehicle attachment to the motor cycle.

Aside from being very strong and durable this particular design of vehicle attachment in nowise interferes with the working of the parts of the regular motor cycle so that no re-adjustment of the same is required when converting the same from one use to another. Owing to the compact arrangement of the parts and the disposition of the same around the motor cycle in the manner indicated in the drawings a neat and finished appearance of the vehicle as a whole is presented.

Furthermore, the cost of this vehicle attachment is comparatively low, thereby enabling persons with moderate means to enjoy the pleasures of motoring without incurring an immoderate outlay for this purpose.

I claim as my invention:

1. A vehicle attachment for motor and other cycles comprising a wheeled frame, and flexible means for connecting said frame at its front end with a motor cycle and constructed to permit free vertical movement of said wheeled frame and the motor cycle relatively to each other but holding said members against horizontal lateral movement relatively to each other.

2. A vehicle attachment for motor cycles comprising a wheeled frame, and means for conecting said frame with a motor cycle comprising a leaf spring arranged with its flat surfaces horizontally and lengthwise of the motor cycle and said wheeled frame.

3. A vehicle attachment for motor cycles comprising a wheeled frame, and means for connecting said frame with a motor cycle comprising a leaf spring arranged with its flat side horizontally and connected at its rear end with said wheeled frame and adapted to be connected at its front end with the frame of the motor cycle.

4. A vehicle attachment for motor and other cycles comprising a wheeled frame having a side part adapted to be arranged at the side of the motor cycle, a bracket adapted to be connected with the front part of the frame of the motor cycle, and means for connecting said wheeled frame with said bracket comprising a spring connected at its front end with said bracket and at its rear end with said wheeled frame.

5. A vehicle attachment for motor and other cycles comprising a wheeled frame having a side part adapted to be arranged at the side of the motor cycle, a bracket adapted to be connected with the front part of the frame of the motor cycle, and means for connecting said wheeled frame with said bracket comprising a leaf spring having its flat surfaces arranged horizontally and connected at its front end with said bracket and at its rear end with said wheeled frame.

6. A vehicle attachment for motor and other cycles comprising a wheeled frame having a side part adapted to be arranged at the side of the motor cycle, a bracket adapted to be connected with the front part of the frame of the motor cycle, and means for connecting said wheeled frame with said bracket comprising a spring connected at its front end with said bracket and at its rear end with said wheeled frame so as to permit said frame to be adjusted lengthwise relatively to the motor cycle.

7. A vehicle attachment for motor and other cycles comprising a wheeled frame having a side part adapted to be arranged at the side of the motor cycle, a bracket adapted to be connected with the front part of the frame of the motor cycle, and means for connecting said wheeled frame with said bracket comprising a spring detachably connected at its front end with said bracket and at its rear end with said wheeled frame.

8. A vehicle attachment for motor and other cycles comprising a wheeled frame having a side part adapted to be arranged at the side of the motor cycle, a bracket adapted to be connected with the front part of the frame of the motor cycle, and means for connecting said wheeled frame with said bracket comprising a spring connected at its front end with said bracket and adjustably connected at its rear end with said wheeled frame to permit of relative longitudinal adjustment of said wheeled frame and the motor cycle frame.

9. A vehicle attachment for motor and other cycles comprising a wheeled frame of substantially U-shaped form the branches of which are adapted to project forwardly along opposite sides of a motor cycle, a bracket adapted to be mounted on the lower front part of the motor cycle frame, and springs connecting the opposite ends of said bracket with the front ends of the branches of said wheeled frame.

10. A vehicle attachment for motor and other cycles comprising a wheeled frame of substantially U-shaped form the branches of which are adapted to project forwardly along opposite sides of a motor cycle, a bracket adapted to be mounted on the lower front bar of the motor cycle frame comprising a horizontal cross bar, two braces converging upwardly from the cross bar and provided at their upper ends with eyes and a clamp secured to the lower front bar of the motor cycle frame and receiving said eyes, and means for connecting opposite ends of said cross bar with the front ends of the branches of said wheeled frame.

11. A vehicle attachment for motor and other cycles comprising a wheeled frame of substantially U-shaped form the branches of which are adapted to project forwardly along opposite sides of a motor cycle, a bracket adapted to be mounted on the lower front bar of the motor cycle frame comprising a horizontal cross bar, two braces converging upwardly from the cross bar and provided at their upper ends with eyes, a clamp composed of two body sections adapted to engage with opposite sides of the lower front part of the motor cycle frame and one of said sections being provided with laterally projecting pivot pins, which receive the eyes of said braces, screws connecting said body sections, screw nuts applied to said pivot pins for retaining said eyes thereon, and means for connecting opposite ends of said cross bar with the front ends of the branches of said wheeled frame.

12. A vehicle attachment for motor and other cycles comprising a wheeled frame of substantially U-shaped form the branches of which are adapted to project forwardly along opposite sides of a motor cycle, a bracket adapted to be mounted on the lower front part of the motor cycle frame and having a cross bar, and a clamp composed of body sections which are adapted to engage said cross bar and a bar of the motor cycle frame and bolts connecting said body sections, and means for connecting opposite ends of said cross bar with the front ends of the branches of said wheeled frame.

13. A vehicle attachment for motor and other cycles comprising a wheeled frame of substantially U-shaped form the branches of which are adapted to project forwardly along opposite sides of a motor cycle, a bracket adapted to be mounted on the lower front part of the motor cycle frame and having a cross bar, arms projecting rearwardly from opposite ends of said cross bar, and means for connecting said arms with the front ends of the branches of said wheeled frame comprising two leaf springs each of which is connected at its front end with one of said arms, two clamping blocks engaging opposite sides of the front end of each branch of the wheeled frame and one of said blocks engaging the rear end of the companion leaf spring, and clips connecting said blocks and the adjacent ends of the respective spring and branch of the wheeled frame.

14. A vehicle attachment for motor and other cycles comprising a wheeled frame of substantially U-shaped form having a cross piece adapted to be arranged in rear of a motor cycle, arms projecting upwardly from opposite ends of said cross piece, wheels mounted on the upper ends of said arms, two long inner longitudinal bars extending forwardly from said cross piece and adapted to be arranged on opposite sides of a motor cycle, and two short outer longitudinal bars extending forwardly from said cross piece and having their front ends turned inwardly and connected with said long inner bars between the ends of the latter.

15. A vehicle attachment for motor and other cycles comprising a wheeled frame of substantially U-shaped form the branches of which are adapted to extend forwardly and embrace the rear part of a motor cycle, guide heads adapted to be arranged on the opposite ends of the rear axle of the motor cycle, and guide channels arranged on the branches of the wheeled frame and receiving said guide heads.

16. A vehicle attachment for motor and other cycles comprising a wheeled frame of substantially U-shaped form the branches of which are adapted to extend forwardly and embrace the rear part of a motor cycle, guide heads adapted to be arranged on the opposite ends of the rear axle of the motor cycle, and guide channels arranged on the branches of the wheeled frame and receiving said guide heads, said channels and heads being constructed to permit said heads to slide lengthwise in said channels but prevent said parts from moving relatively to each other in a direction crosswise and lengthwise of the attachment and motor cycle.

17. A vehicle attachment for motor and other cycles comprising a wheeled frame of substantially U-shaped form the branches of which are adapted to extend forwardly and embrace the rear part of a motor cycle, guide heads adapted to be mounted on opposite ends of the rear axle of the motor cycle and each provided on its horizontal opposite sides with rollers the axes of which are at right angles to the axis of said motor cycle axle, and guide channels pivoted on said frame to swing vertically lengthwise of said frame and each provided on its inner side with grooves which open toward each other and receive the rollers of one of said heads.

18. A wheeled carrier attachment for motor cycles comprising a frame, supporting wheels therefor adapted to be disposed on opposite sides of the rear wheel of the motor cycle, and a coupling hinged to the frame of the carrier connecting the frame to the frame of the motor cycle and adapted to permit the carrier to rise and fall in relation to the motorcycle.

19. A wheeled carrier attachment for motorcycles comprising a frame, supporting wheels therefor adapted to be disposed on opposite sides of the rear wheel of the motorcycle, and yieldable coupling means connected to the frame of the carrier and to the axle of the rear wheel of the motorcycle adapted to permit the carrier to rise and fall in relation to the motorcycle.

20. A wheeled carrier attachment for motorcycles comprising a frame adapted for connection to the motorcycle frame, supporting wheels therefor adapted to be disposed on opposite sides of the rear wheel of the motorcycle, a coupling connection having a hinged joint with the frame of the carrier, said coupling connection being also adapted for detachable connection to the axle of the rear wheel of the motorcycle, said coupling means aforesaid being adapted to permit the carrier to rise and fall while being drawn by the motorcycle.

OTTO L. HEINTZ.

Copies of this patent may be obtained for five cents each, by addressing the "Commissioner of Patents, Washington, D. C."